United States Patent [19]

Shekleton et al.

[11] Patent Number: 5,069,031

[45] Date of Patent: Dec. 3, 1991

[54] GAS TURBINE ENGINE STORED ENERGY COMBUSTION SYSTEM

[75] Inventors: Jack R. Shekleton, San Diego; Roy W. Vershure, Jr., Escondido; Robert W. Smith, Lakeside, all of Calif.

[73] Assignee: Sundstrand Corporation, Rockford, Ill.

[21] Appl. No.: 383,753

[22] Filed: Jul. 24, 1989

[51] Int. Cl.[5] ............................ F02C 3/14; F23R 3/30
[52] U.S. Cl. ............................... 60/39.12; 60/39.142; 60/39.21
[58] Field of Search ............... 60/39.142, 39.12, 39.21, 60/742, 39.181

[56] References Cited

U.S. PATENT DOCUMENTS

| | | | |
|---|---|---|---|
| 2,916,367 | 12/1959 | Stokes | 60/39.12 |
| 4,092,824 | 6/1978 | Friedrich | 60/39.142 |
| 4,759,178 | 7/1988 | Joy | 60/39.142 |
| 4,819,423 | 4/1989 | Vershure, Jr. et al. | 60/39.142 |
| 4,899,536 | 2/1990 | Vershure | 60/39.142 |

FOREIGN PATENT DOCUMENTS

| | | | |
|---|---|---|---|
| 165526 | 9/1983 | Japan | 60/39.12 |
| 712843 | 8/1954 | United Kingdom | 60/39.12 |

Primary Examiner—Louis J. Casaregola
Assistant Examiner—Timothy S. Thorpe
Attorney, Agent, or Firm—Wood, Phillips, Mason, Recktenwald & VanSanten

[57] ABSTRACT

Improved starting for turbine engines operating at low fuel flows and at high altitudes is accomplished in an engine 10 having an annular combustion 12 by utilizing a stored energy combustion system 28 which includes a source of oxidant 36 and a fuel source 38 both of which are in fluid communication with an auxiliary combustion space 32 of an auxiliary combustor 30 for combusting the oxidant and fuel to generate a gaseous fuel including secondary gases of combustion which are directed to the annular combustor 12 through a fuel injector 24 as a reactive, gaseous fuel ignitable therewithin.

8 Claims, 1 Drawing Sheet

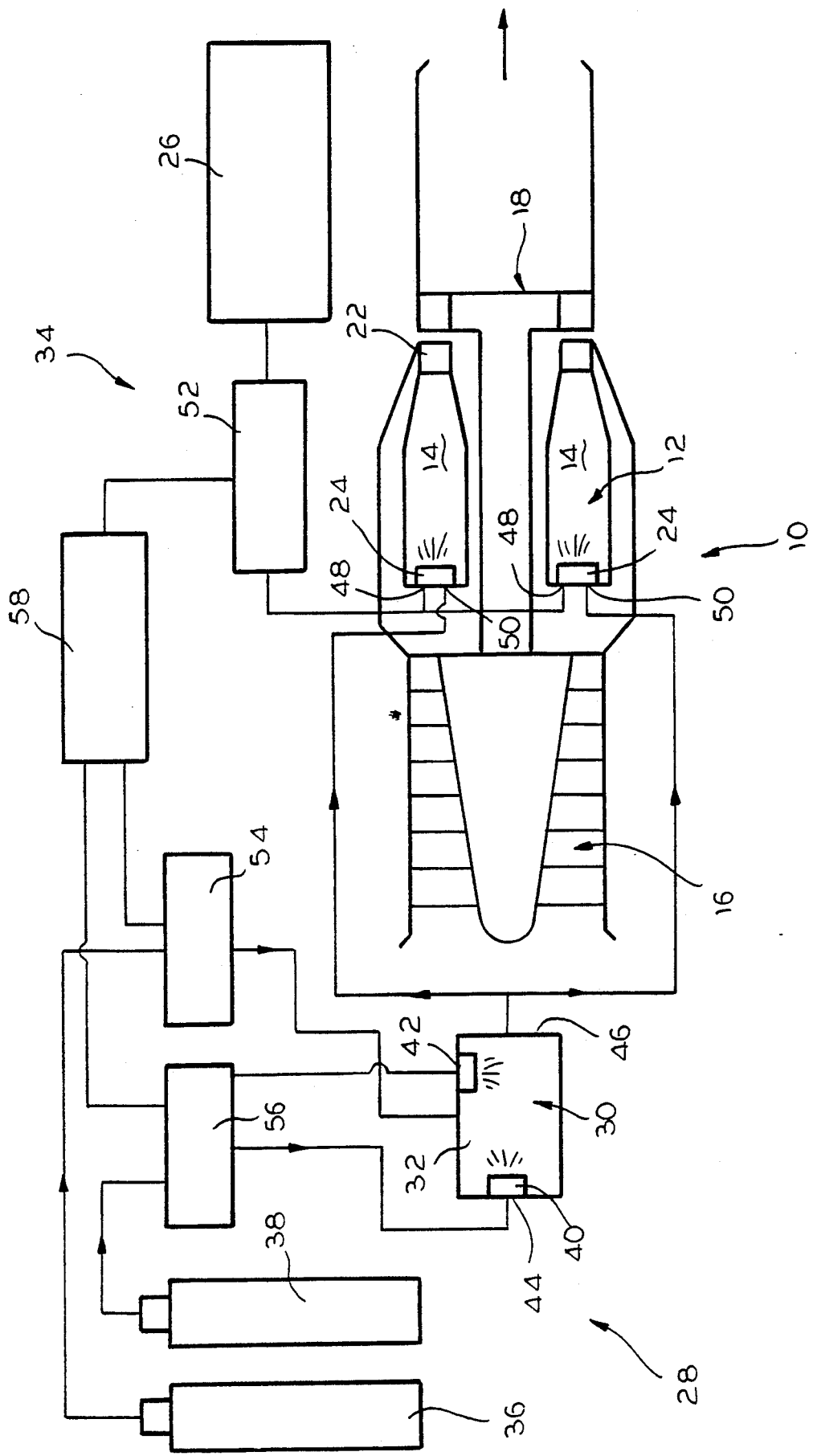

5,069,031

GAS TURBINE ENGINE STORED ENERGY COMBUSTION SYSTEM

FIELD OF THE INVENTION

This invention relates to gas turbine engines and, more particularly, to gas turbine engines having a stored energy combustion system.

BACKGROUND OF THE INVENTION

Gas turbine engines are known to have marginal combustion at very high altitudes which is attributable at least in part to the low fuel flows per injector In fact, fuel flows at high altitudes on the order of fifty thousand feet are frequently quite low during starting, e.g., less than three pounds per hour per injector. Moreover, the high fuel viscosity encountered in cold high altitude conditions adds further difficulty to achieving reliable starting.

In instances where, after flameout, a restart must be achieved at high altitude, then special means are often employed. Hence pyrophoric fuels, which ignite spontaneously on contact with air, can be employed during starting. These are dangerous chemicals, typically restricted to use in military aircraft, which are regarded as undesirable.

If the gas turbine engine experiences flameout, at high altitude it is usually necessary to descend to a much lower altitude before it can be restarted Typically, this may require a descent to an altitude of thirty thousand feet or less which is most undesirable in combat and since the gas turbine engine will most likely spool down. Once engine spool down occurs, it is most difficult to achieve high altitude starting where conventional liquid fuel is utilized.

Additionally, the starting of a gas turbine is made difficult because of problems in providing adequate fuel atomization even at altitudes on the order of thirty thousand feet. At higher altitudes, starting is also limited by kinetic loading. Additionally, even at full engine speed kinetic loading limits, i.e., difficulty in burning or completing the combustion reaction, is limiting and it causes a tendency for flameout and combustion inefficiency.

The present invention is directed to overcoming one or more of the above problems.

SUMMARY OF THE INVENTION

It is the principal object of the invention to provide a new and improved turbine engine having enhanced operational reliability. More specifically, it is an object of the invention to provide a new and improved stored energy combustion system for a turbine engine which provides a reactive, gaseous fuel adequate to achieve reliable high altitude starts but which may nonetheless be manufactured inexpensively. It is a further object of the invention to provide a multiple mode fuel injector capable of injecting both liquid and gaseous fuels into a combustor.

An exemplary embodiment of the invention achieves the foregoing objects in a gas turbine engine including a rotary compressor and a turbine wheel coupled to the compressor for driven movement thereof. An annular nozzle is proximate the turbine wheel for directing primary gases of combustion from an annular combustion space of an annular combustor at the turbine wheel. With the annular combustor in fluid communication with the rotary compressor, a primary fuel source, and the annular nozzle it is adapted to combust fuel and air to generate the primary gases of combustion.

Fuel injection means is operatively associated with the annular combustor for injecting fuel from the primary fuel source into the annular combustion space. A stored energy combustion system is also provided which includes a source of oxidant and a secondary fuel source both of which are in fluid communication with an auxiliary combustion space of an auxiliary combustor for selectively combusting oxidant from the source of oxidant and fuel from the secondary fuel source to generate the secondary gases of combustion. With the auxiliary combustor in fluid communication through the fuel injection means with the annular combustor, the fuel injection means is adapted to direct the secondary gases of combustion into the annular combustor's fuel injectors upon demand.

In a preferred embodiment, the stored energy combustion system includes a first fuel injector for injecting fuel from the secondary fuel source into the auxiliary combustion space of the auxiliary combustor for combusting the fuel and oxidant to generate the secondary gases of combustion. It also includes a second fuel injector for injecting fuel from the secondary fuel source into the auxiliary combustion space for mixing additional fuel with the secondary gases of combustion for delivery to the fuel injection means operatively associated with the annular combustor. Still additionally, the fuel injection means operatively associated with the annular combustor advantageously comprises a multiple mode fuel injector having one fuel inlet connected to the primary fuel source and the other fuel inlet connected to the auxiliary combustion space of the auxiliary combustor.

In a highly preferred embodiment, the first fuel injector is mounted in the auxiliary combustor at an inlet end thereof and the second fuel injector injects fuel into the auxiliary combustor near an outlet end thereof. The oxidant is then combusted with fuel injected through the first injector to produce heat in the form of the secondary gases of combustion whereas the fuel injected by the second fuel injector is thermally cracked by heat from the secondary gases of combustion. In this manner, the additional fuel injected by the second fuel injector is thermally cracked just upstream of the auxiliary combustor outlet end to produce a highly combustible gaseous mixture of the secondary gases of combustion and thermally cracked fuel.

Other objects, advantages and features of the invention will become apparent from the following specification taken in conjunction with the accompanying drawing.

BRIEF DESCRIPTION OF THE DRAWING

The drawing is a schematic sectional view of a turbine engine embodying the invention.

DETAILED DESCRIPTION OF THE PREFERRED EMBODIMENT

An exemplary embodiment of a gas turbine engine having a stored energy combustion system in accordance with the invention is illustrated in the drawing. However, the invention is not limited to any particular type of turbine but may have applicability to any form of gas turbine engine.

Referring to the drawing, the reference numeral 10 designates generally a gas turbine engine having an annular combustor 12 defining an annular combustion space 14 therewithin. The gas turbine engine 10 also includes a rotary compressor 16 and a turbine wheel, generally designated 18, which is coupled to the compressor 16 by means of a shaft 20 for driven movement of the compressor 16 together with an annular nozzle 22 proximate the turbine wheel 18 for directing primary gases of combustion thereat. As will also be seen, the gas turbine engine 10 includes fuel injection means such as the multiple mode fuel injector 24 which is operatively associated with the annular combustor 12.

More specifically, fuel injectors 24 are adapted to inject fuel into the annular combustion space 14 which is in fluid communication with a primary fuel source 26 through the fuel injector(s) 24. It will also be appreciated that the annular combustion space 14 is in fluid communication with the rotary compressor 16 and with the annular nozzle 22, all of which may suitably be achieved by conventional means. With this arrangement, the annular combustor 12 is adapted to combust fuel from the primary fuel source 26 and air from the compressor 16 to generate the primary gases of combustion for driving the turbine wheel 18.

In accordance with the invention, a stored energy combustion system 28 includes a selectively operable, i.e., operable upon demand, auxiliary combustor 30 having an auxiliary combustion space 32. The auxiliary combustor 30 is thus well suited for selectively generating gases of combustion for starting the gas turbine engine 10 through an air turbine starter, although the stored energy combustion system 28 is normally considered auxiliary or supplementary to the primary energy combustion system, generally designated 34, which comprises the previously described annular combustor 12, rotary compressor 16, multiple mode fuel injector(s) 24 and primary fuel source 26. Because of the utilization of the multiple mode fuel injector(s) 24, the annular combustor 12 can be used for combusting liquid fuel from the primary fuel source 26 or gaseous fuel from the auxiliary combustor 30.

Referring once again to the stored energy combustion system 28, it further includes a source of oxidant 36 and a secondary fuel source 38 both of which are in fluid communication with the auxiliary combustion space 32 of the auxiliary combustor 30. Thus, oxidant from the source of oxidant 36 and fuel from the secondary fuel source 38 may be combusted in the auxiliary combustion space 32 of the auxiliary combustor 30 to generate the secondary gases of combustion upon demand for delivery to the fuel injectors 24 of the primary energy combustion system 34 for driving the gas turbine engine 10. For this purpose, the auxiliary combustor 30 is in fluid communication with the primary energy combustion system 34 through the multiple mode fuel injector(s) 24 so that the gaseous fuel including the secondary gases of combustion produced in the auxiliary combustion space 32 may be directed thereto.

As shown in the drawing, a first fuel injector 40 is provided for injecting fuel from the secondary fuel source 38 into the auxiliary combustion space 32 of the auxiliary combustor 30 for combusting the fuel and oxidant to generate the secondary gases of combustion. It will also be appreciated that a second fuel injector 42 is provided for injecting fuel from the secondary fuel source 38 into the auxiliary combustion space 32 of the auxiliary combustor 30 for producing a mixture of fuel with the secondary gases of combustion prior to directing the mixture to the fuel injectors 24 of the primary energy combustion system 34. Still more specifically, the first fuel injector 40 is preferably mounted in the auxiliary combustor 30 at an inlet end 44 thereof whereas the second fuel injector 42 is preferably mounted in the auxiliary combustor 30 near an outlet end 46 thereof.

With this arrangement, the oxidant is combusted with fuel injected through the first fuel injector 40 to produce heat in the form of the secondary gases of combustion. On the other hand, the second fuel injector 42 injects fuel from the secondary fuel source 38 into the auxiliary combustor 30 for the purpose of being thermally cracked by heat from the secondary gases of combustion into hydrogen and carbon monoxide which is later oxidized with air from the rotary compressor 16 within the annular combustor 12. In this connection, the fuel is thermally cracked upstream of the outlet end 46 of the auxiliary combustor 30 to produce a highly combustible gaseous mixture of the secondary gases of combustion and the thermally cracked fuel.

As previously mentioned, the multiple mode fuel injector 24 is adapted to inject fuel, e.g., liquid fuel, from the primary fuel source 26 into the annular combustion space 14. It is also adapted to direct the highly combustible gaseous mixture of the secondary gases of combustion and the thermally cracked fuel from the auxiliary combustor 30 into the fuel injectors 24 of the annular combustor 12 upon demand. Consistent with its capability of directing either liquid fuel or gaseous fuel to the annular combustor 12, the multiple mode fuel injector 24 is preferably operable in at least three modes.

For this purpose, the multiple mode fuel injector 24 has a pair of fuel inlets 48 and 50 with one of the fuel inlets 48 being connected to the primary fuel source 26 and the other of the fuel inlets 50 being connected to the auxiliary combustion space 32 of the auxiliary combustor 30. This accommodates operation of the multiple mode fuel injector 24 in a first mode to inject into the annular combustion space 14 fuel from the primary fuel source 26 and in a second mode for injecting into the annular combustion space 14 a mixture from the auxiliary combustion space 32 comprising secondary gases of combustion and fuel from the secondary fuel source 38, all of which has been formed into a highly combustible gaseous mixture as a result of thermal cracking of the fuel from the secondary fuel source 38. Still additionally, the multiple mode fuel injector 24 is operable in a third mode to inject into the annular combustion space 14 variable quantities of both fuel from the primary fuel source 26 and the highly combustible gaseous mixture from the auxiliary combustion space 32, depending upon operating conditions.

As shown in the drawing, the primary energy combustion system 34 will advantageously include a fuel control valve 52 disposed so as to control the flow of fuel from the primary fuel source 26 to the multiple mode fuel injector 24. It will also be noted that the stored energy combustion system 28 advantageously includes a first control valve 54 operatively associated with the source of oxidant 36 and a second control valve 56 operatively associated with the secondary fuel source 38 so as to control the flow of oxidant and fuel for combustion in the auxiliary combustor 30. As also shown, a controller 58 is operatively associated with the control valves 52, 54 and 56 for controlling the mode of operation, i.e., the type(s) and quantity of fuel being supplied to the annular combustor 12.

With the arrangement illustrated in the drawing, the stored energy combustion system 28 is capable of providing an extremely reactive, gaseous fuel. This fuel can be provided in less than two seconds and, in most cases, less than one second so that in an emergency such as flameout, gaseous fuel can be supplied so that the gas turbine engine 10 does not spool down. Once stable operation is again achieved, conventional liquid fuel from the primary fuel source 26 can once again be delivered to the annular combustor 12.

Because of the multiple mode nature of the fuel injector 24, the extremely reactive, gaseous fuel from the stored energy combustion system 28 can be used for high altitude operation on a full time basis. It will also be appreciated that it can be used for starting purposes at high altitudes, particularly in the case of flameout. Still further, the extremely reactive, gaseous fuel from the stored energy combustion system 28 can be used for auxiliary power unit operation at very high altitudes or cranking the main engine for starting or even for emergency power unit applications.

Because of the versatility of the invention, the stored energy combustion system 28 can be operated over a wide range of fuel flows. This permits control of fuel from the stored energy combustion system 28 as required to operate the gas turbine engine 10. Clearly, supplying such a highly combustible gaseous mixture greatly reduces or eliminates the problems associated with high altitude operation.

As will be appreciated, the present invention is not limited in any sense to any particular type of oxidant or fuel. On the contrary, specific parameters can be developed by those skilled in the art depending upon operating conditions and requirements so long as the resulting mixture of secondary gases and thermally cracked fuel comprises a sufficiently reactive gaseous mixture for delivery to the annular combustor 12. In this manner, there is easier starting, less difficulty in completing the combustion reaction, and reduced tendency for flameout.

Finally, the gaseous mixture of secondary gases and thermally cracked fuel is easily handled by the multiple mode fuel injector 24. This can be done, by way of example, by directing the highly combustible gaseous mixture produced in the auxiliary combustor 30 through the axially extending central passage 56 as illustrated in FIG. 1 of commonly owned U.S. Pat. No. 4,373,325 (in place of air), and the teachings of this patent are hereby incorporated herein by reference. Clearly, this represents a substantial improvement over current technology concerning stability of flame, size and length of combustor, coolness of walls, etc.

While in the foregoing there have been set forth preferred embodiments of the invention, it will be appreciated that the invention is only to be limited by the true spirit and scope of the appended claims.

We claim:

1. A gas turbine engine, comprising:

a rotary compressor;

a turbine wheel coupled to said compressor for driven movement thereof;

an annular nozzle proximate said turbine wheel for directing primary gases of combustion thereat;

an annular combustor defining an annular combustion space in fluid communication with said rotary compressor, a primary fuel source, and said annular nozzle;

said annular combustor being adapted to combust fuel from said primary fuel source and air from said compressor to generate said primary gases of combustion;

fuel injection means operatively associated with said annular combustor for injecting fuel from said primary fuel source into said annular combustion space; and a stored energy combustion system including a selected operable auxiliary combustor having an auxiliary combustion space for generating a gaseous fuel including secondary gases of combustion therein, said stored energy combustion system including a source of oxidant and a secondary fuel source both in fluid communication with said auxiliary combustion space of said auxiliary combustor for combusting oxidant from said source of oxidant and fuel from said secondary fuel source to generate said gaseous fuel including said secondary gases of combustion therein, said auxiliary combustor being in direct fluid communication with said annular combustor for directing said gaseous fuel including said secondary gases of combustion therein to said annular combustor through said fuel injection means;

said fuel injection means being adapted to direct said gaseous fuel including said secondary gases of combustion therein from said auxiliary combustor directly into said annular combustor upon demand;

said stored energy combustion system including a first fuel injector for injecting fuel from said secondary fuel source into said auxiliary combustion space of said auxiliary combustor for combusting said fuel and oxidant from said source of oxidant to generate said secondary gases of combustion, said stored energy combustion system also including a second fuel injector for injecting fuel from said secondary fuel source into said auxiliary combustion space of said auxiliary combustor for mixing said fuel with said secondary gases of combustion for delivery to said fuel injection means operatively associated with said annular combustor, said secondary gases of combustion generated in said auxiliary combustion space producing heat to cause said fuel injected into said auxiliary combustor by said second fuel injector to be thermally cracked prior to being oxidized with air from said rotary compressor.

2. The gas turbine engine as defined in claim 1 wherein said fuel injection means operatively associated with said annular combustor comprises a multiple mode fuel injector having a pair of fuel inlets, one of said fuel inlets being connected to said primary fuel source and the other of said fuel inlets being connected to said auxiliary combustion space of said auxiliary combustor.

3. The gas turbine engine as defined in claim 2 wherein said multiple mode fuel injector is operable in a first mode to inject into said annular combustion space fuel from said primary fuel source and in a second mode for injecting into said annular combustion space a mixture from said auxiliary combustion space comprising said fuel from said secondary fuel source and said secondary gases of combustion therein.

4. The gas turbine engine as defined in claim 3 wherein said multiple mode fuel injector is operable in a third mode to inject into said annular combustion space variable quantities of both fuel from said primary fuel source and a mixture from said auxiliary combustion space comprising said fuel and said secondary gases of combustion therein depending upon operating conditions.

5. A gas turbine engine, comprising:
a rotary compressor;
a turbine wheel coupled to said compressor for driven movement thereof;
an annular nozzle proximate said turbine wheel for directing primary gases of combustion thereat;
an annular combustor defining an annular combustion space in fluid communication with said rotary compressor, a primary fuel source, and said annular nozzle;
said annular combustor being adapted to combust fuel from said primary fuel source and air from said compressor to generate said primary gases of combustion;
fuel injection means operatively associated with said annular combustor for injecting fuel from said primary fuel source into said annular combustion space; and
a stored energy combustion system including a selectively operable auxiliary combustor having an auxiliary combustion space for generating a gaseous fuel including secondary gases of combustion therein, said stored energy combustion system including a source of oxidant and a secondary fuel source both in fluid communication with said auxiliary combustion space of said auxiliary combustor for combusting oxidant from said source of oxidant and fuel from said secondary fuel source to generate said gaseous fuel including said secondary gases of combustion therein, said auxiliary combustor being in direct fluid communication with said annular combustor for directing said gaseous fuel including said secondary gases of combustion therein to said annular combustor through said fuel injection means;
said fuel injection means being adapted to direct said gaseous fuel including said secondary gases of combustion therein from said auxiliary combustor directly into said annular combustor upon demand;
said stored energy combustion system including a first fuel injector for injecting fuel from said secondary fuel source into said auxiliary combustion space of said auxiliary combustor for combusting said fuel with oxidant from said source of oxidant to generate said secondary gases of combustion;
said stored energy combustion system also including a second fuel injector for injecting fuel from said secondary fuel source into said auxiliary combustion space of said auxiliary combustor for mixing said gaseous fuel with said secondary gases of combustion for delivery to said fuel injection means operatively associated with said annular combustor;
said fuel injection means operatively associated with said annular combustor comprising a multiple mode fuel injector having a pair of fuel inlets, one of said fuel inlets being connected to said primary fuel source and the other of said fuel inlets being connected to said auxiliary combustion space of said auxiliary combustor;
said second fuel injector injecting said fuel from said secondary fuel source into said auxiliary combustor to be thermally cracked by heat from said secondary gases of combustion prior to being oxidized with air from said rotary compressor upstream of the corresponding one of said fuel inlets of said multiple mode fuel injector operatively associated with said annular combustor.

6. The gas turbine engine as defined in claim 5 wherein said multiple mode fuel injector is operable in a first mode to inject into said annular combustion space fuel from said primary fuel source and in a second mode for injecting into said annular combustion space a mixture from said auxiliary combustion space comprising said fuel from said secondary fuel source and said secondary gases of combustion therein.

7. The gas turbine engine as defined in claim 6 wherein said multiple mode fuel injector is operable in a third mode to inject into said annular combustion space variable quantities of both fuel from said primary fuel source and a mixture from said auxiliary combustion space comprising said fuel and said secondary gases of combustion depending upon operating conditions.

8. The gas turbine engine as defined in claim 5 wherein said first fuel injector is mounted in said auxiliary combustor at an inlet end thereof, said oxidant being combusted with fuel injected through said first fuel injector to produce heat in the form of said secondary gases of combustion, said second fuel injector being mounted in said auxiliary combustor near an outlet end thereof.

* * * * *